US009269151B2

(12) United States Patent
Zahand (10) Patent No.: US 9,269,151 B2
(45) Date of Patent: Feb. 23, 2016

(54) MANUFACTURING LINE MONITORING (71) Applicant: MICROSOFT TECHNOLOGY LICENSING, LLC, Redmond, WA (US)

(72) Inventor: Brannon Zahand, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 40 days.

(21) Appl. No.: 14/178,162

(22) Filed: Feb. 11, 2014

(65) Prior Publication Data
US 2015/0228078 A1    Aug. 13, 2015

(51) Int. Cl.
G06K 9/00 (2006.01)
G06T 7/00 (2006.01)
G06T 7/20 (2006.01)

(52) U.S. Cl.
CPC .......... *G06T 7/0046* (2013.01); *G06K 9/00771* (2013.01); *G06T 7/2046* (2013.01); *G06T 2207/10021* (2013.01); *G06T 2207/30196* (2013.01); *G06T 2207/30232* (2013.01)

(58) Field of Classification Search
CPC ............. G06F 17/271; G06F 17/2715; G06F 17/2785; G06F 17/50; G06F 19/3418; G06F 19/3487; G06F 19/3431; A61B 5/6891; A61B 5/01; A61B 5/4872; A61B 5/002; A61B 5/0537; A61B 5/6897; A61B 5/7275; A61B 5/02055; A61B 5/0008; A61B 5/0021; A61B 5/08; A61B 5/1113; A61B 5/1114; A61B 5/6803; A61B 5/7282; A61B 5/744; A61B 5/0476; A61B 5/165; A61B 5/145; A61B 5/40; A61B 5/6887; A61B 5/6898; A61B 5/742

USPC .......................................................... 382/103
See application file for complete search history.

(56) References Cited

U.S. PATENT DOCUMENTS

| 8,465,108 | B2 | 6/2013 | Markovic et al. | |
|---|---|---|---|---|
| 2007/0222595 | A1 | 9/2007 | Motteram et al. | |
| 2008/0170749 | A1* | 7/2008 | Albertson et al. | 382/103 |
| 2009/0237247 | A1* | 9/2009 | Brunetti et al. | 340/541 |
| 2013/0012802 | A1* | 1/2013 | Horseman | 600/383 |

OTHER PUBLICATIONS

Beling, Peter A. et al., "Characterization of Worker Activity Using Continuous Motion Data", http://nyuwireless.com/wicat/09.pdf, Jul. 23, 2013, 1 page.
Blommestein, D.L. van et al., "Automation of Work Studies: An Evaluation of Methods for a Computer Based System", CIE42 Proceedings, Jul. 2012, 14 pages.
Pajaro, Hector Garcia, "A 3D Real-Time Monitoring System for a Production Line", A Master of Science Thesis, Tampere University of Technology, May 9, 2012, 87 pages.

\* cited by examiner

*Primary Examiner* — Ali Bayat
(74) *Attorney, Agent, or Firm* — Gregg Wisdom; Judy Yee; Micky Minhas (57) ABSTRACT

Systems and method for monitoring a workstation region of a manufacturing line are provided. In one example, depth image data is received from one or more depth cameras trained on the workstation region, with the data comprising a temporal sequence of images of an operator. Using the depth image data, a series of movements of the operator is tracked in 3D space of the workstation region. Operational status data is received from the manufacturing line indicating the manufacturing line is operating. Using the series of movements, the operator is determined to be within a predetermined distance of a hazard. In response, a command is issued to the manufacturing line to cease operating.

18 Claims, 8 Drawing Sheets

MANUFACTURING LINE MONITORING

BACKGROUND

Manufacturers are continually striving to eliminate waste and improve product quality and efficiency, while also maintaining secure and safe working environments and production lines. Large scale manufacturing lines can be difficult to monitor in a reasonable level of detail without continual, in-person monitoring, random in-person audits, and/or closed circuit video monitoring systems that are staffed with one or more people studying the video feeds. In addition, studying the movements of workers and/or parts over a period of time to determine potential improvements to a production system can be tedious and involve significant manual observation, data entry, and analysis before a improvements can be identified and trialed.

SUMMARY

To address the above issues, systems and methods for monitoring a workstation region of a manufacturing line are provided. In one example, a method may include receiving depth image data from one or more depth cameras trained on the workstation region, with the depth image data comprising a temporal sequence of images of an operator. Using the depth image data, a series of movements of the operator may be tracked in 3D space of the workstation region. Operational status data from the manufacturing line may be received that indicates the manufacturing line is operating. Using the series of movements, it may be determined that the operator is within a predetermined distance of a hazard in the workstation region. In response to determining that the operator is within the predetermined distance of the hazard, a command to cease operating may be issued to the manufacturing line.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
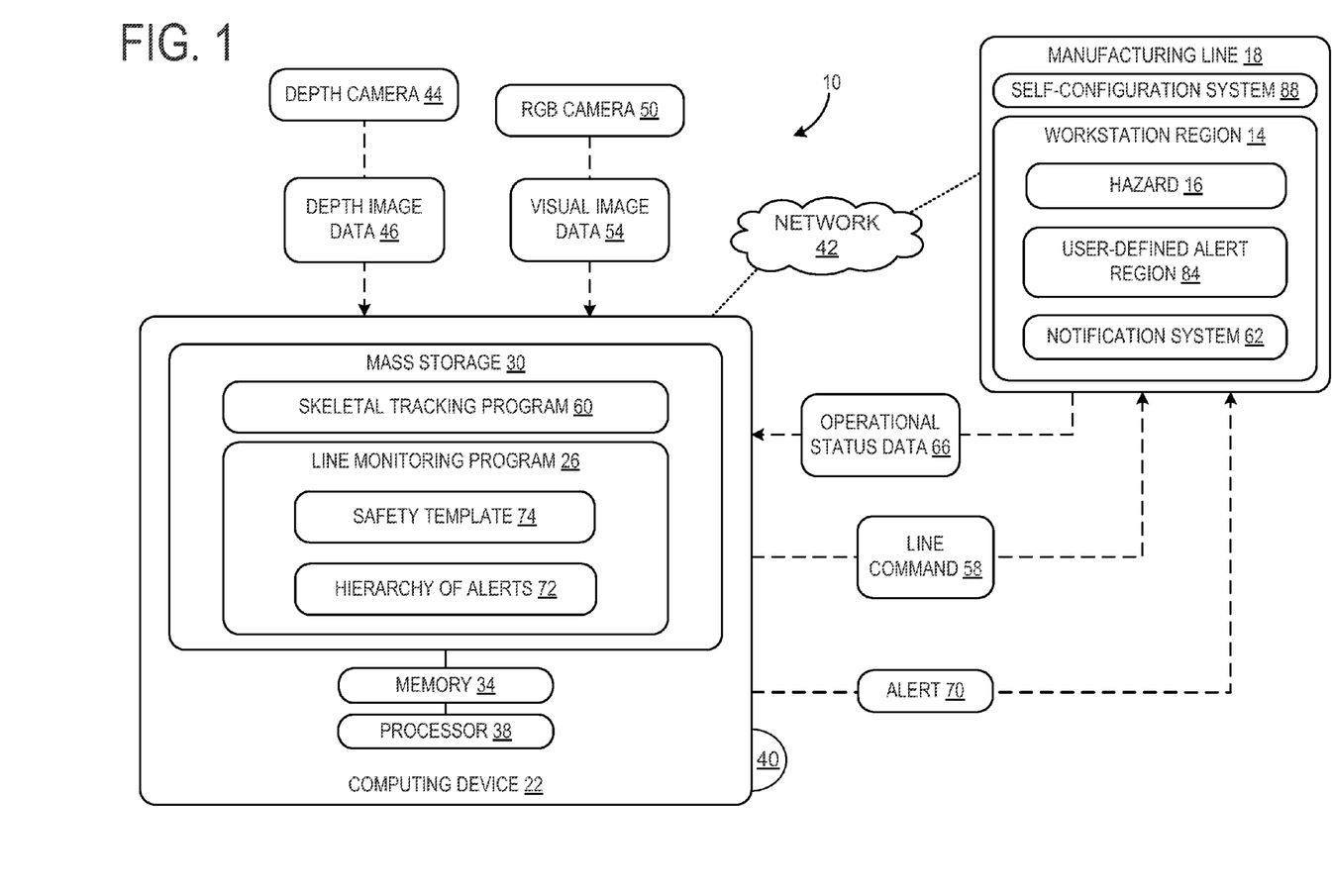
FIG. 1 is a schematic view of a monitoring system for a workstation region of a manufacturing line according to an embodiment of the present disclosure.

FIG. 1 is a schematic illustration of a monitoring system 10 for a workstation region 14 of a manufacturing line 18 according to an embodiment of the present disclosure. The monitoring system 10 may comprise a computing device 22 that includes a line monitoring program 26 stored in mass storage 30 of the computing device 22. The line monitoring program 26 may be loaded into memory 34 and executed by a processor 38 of the computing device 22 to perform one or more of the methods and processes described in more detail below.

In some examples the line monitoring program 26 may be received by the computing device 22 from removable computer-readable storage media 40, shown here in the form of a DVD. The removable computer-readable storage media 40 may also take any other suitable such as, for example, CDs, HD-DVDs, Blu-Ray Discs, EEPROMs, and/or floppy disks, among others. In other examples, the line monitoring program 26 may be received from a remote source via network 42. The network 42 may take the form of a local area network (LAN), wide area network (WAN), wired network, wireless network, personal area network, or a combination thereof, and may include the Internet.

As described in more detail below, in some examples the computing device 22 may be communicatively coupled via network 42 to one or more production facilities that include one or more manufacturing lines, such as manufacturing line 18. Such manufacturing lines may be located in a manufacturing facility, quality control setting or other similar location in which products, components, devices, and/or other items are manufactured and/or tested. In some examples, computing device 22 may be directly connected to the manufacturing line 18 via a wired connection such as, for example, where the computing device 22 is embedded in manufacturing line 18.

Computing device 22 may take the form of a desktop computer, laptop computer, tablet computing device, mobile computer, networking computer, or any other type of suitable computing device. Additional details regarding the components and computing aspects of the computing device 22 are described in more detail below with respect to FIG. 7.

With continued reference to FIG. 1, the monitoring system 10 includes one or more depth cameras 44 that may be trained on the workstation region 14 of the manufacturing line 18. A depth camera 44 may generate depth image data 46 that is provided to the computing device 22. In one example, the depth camera 44 may include left and right cameras of a stereoscopic vision system. Time-resolved images from one or more of these depth cameras may be registered to each other and/or to images from another optical sensor, such as a visible spectrum camera, and may be combined to yield depth-resolved video. It will be appreciated that in some examples depth image data 46 may include visual image data, such as RGB data.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will also be appreciated that any other suitable depth camera may be used within the scope of the present disclosure.

In some examples the monitoring system 10 may also include one or more other sensors for receiving input from the workstation region 14 of the manufacturing line 18. Such other sensors may include an image capture device, such as an RGB video camera 50 that captures visual image data 54. Other examples of sensors may include, but are not limited to, a monochrome video camera that captures monochrome image data such as IR image data, a thermal imaging camera, one or more microphones, pressure sensors, weight sensors, seismic sensors, magnetic sensors etc.

Figure 2:
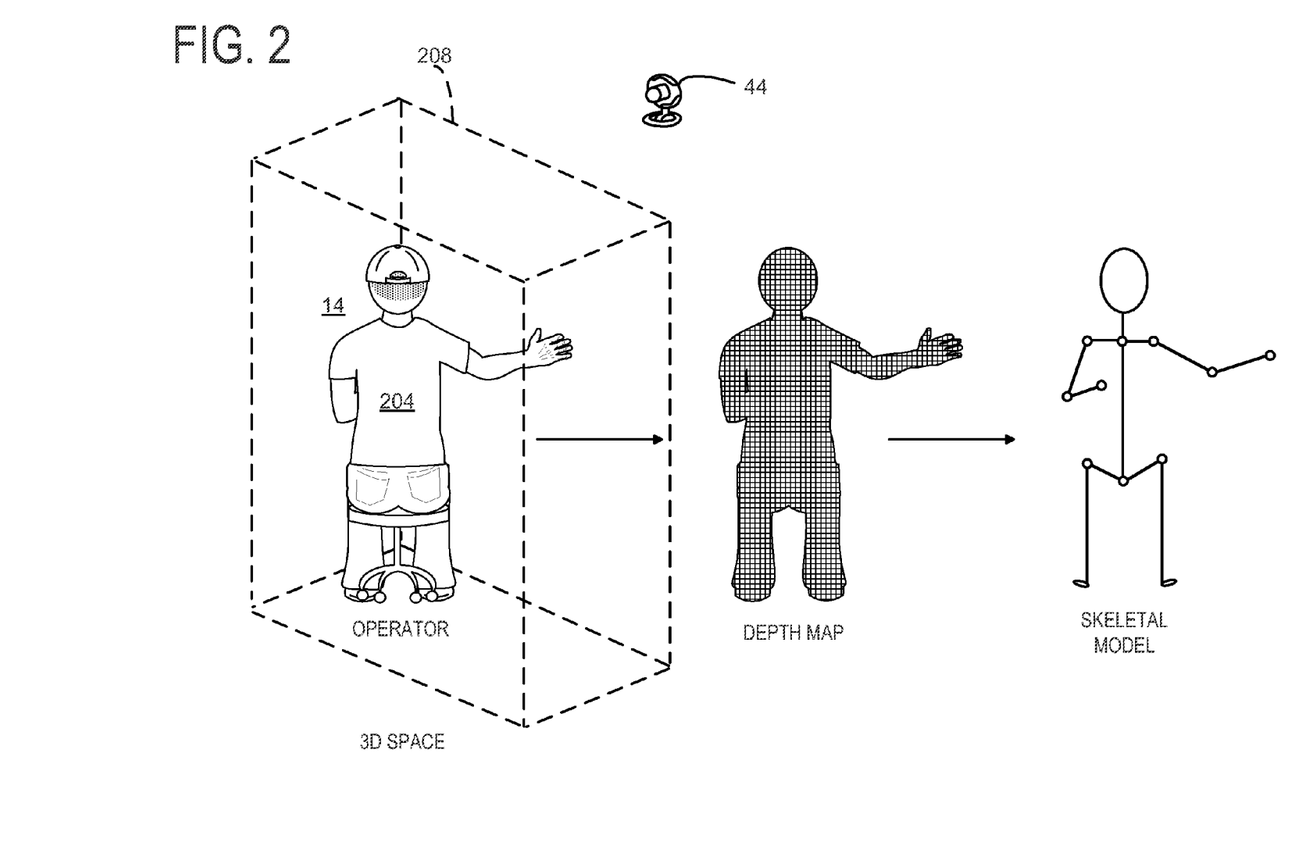
FIG. 2 is a schematic illustration of a human operator in an observed scene being modeled with example skeletal data by the monitoring system of FIG. 1.

With reference now also to FIG. 2, a skeletal tracking program 60 of computing device 22 may utilize the depth image data 46 to generating a skeletal model of an operator 204 in the workstation region 14 based on a captured temporal sequence of images of the operator. The skeletal model may track a series of movements of the operator 204 within a 3D space 208 of the workstation region 14. As described in more detail below, using the depth image data 46 and corresponding series of movements, the line monitoring program 26 may determine that the operator is within a predetermined distance of one or more hazards 16 in the workstation region 14. In response, the line monitoring program 26 may issue a line command 58 to the manufacturing line 18 to cease operating and/or take other corresponding actions such as issuing an alert to a notification system 62 associated with the manufacturing line 18.

FIG. 2 shows a simplified processing pipeline in which an operator 204 in 3D space 208 of the workstation region 14 is modeled as a virtual skeleton that can be used by the line monitoring program 26 to control the manufacturing line 18 and take other corresponding actions with respect to the line. It will be appreciated that a processing pipeline may include additional steps and/or alternative steps to those depicted in FIG. 2 without departing from the scope of this disclosure.

As shown in FIG. 2, operator 304 and the rest of the 3D interaction space may be imaged by a capture device such as depth camera 44. The depth camera 44 may determine, for each pixel, the depth of a surface in the observed scene relative to the depth camera. Virtually any depth finding technology may be used without departing from the scope of this disclosure. It will be appreciated that the manufacturing line 18 as well as other equipment, components and features within the workstation region 14 may also be imaged by depth camera 44.

The depth information determined for each pixel may be used to generate a depth map. Such a depth map may take the form of virtually any suitable data structure, including but not limited to a matrix that includes a depth value for each pixel of the observed scene. In FIG. 2, the depth map is schematically illustrated as a pixelated grid of the silhouette of operator 204. This illustration is simplified for ease of understanding. It is to be understood that a depth map generally includes depth information for all pixels captured in the observed scene, not just pixels that image the operator 204, and that the perspective of depth camera 44 would not result in the silhouette depicted in FIG. 2. Accordingly, a depth map of the workstation region 14 may include portions of the manufacturing line 18 as well as other equipment, components and features within the workstation region 14.

A virtual skeleton may be derived from the depth map to model operator 204 and provide a machine readable representation of the operator. The virtual skeleton may be derived from the depth map in any suitable manner. In some embodiments, one or more skeletal fitting algorithms may be applied to the depth map. The present disclosure is compatible with virtually any skeletal modeling techniques.

The virtual skeleton may include a plurality of joints, each joint corresponding to a portion of the operator 204. In FIG. 2, the virtual skeleton is illustrated as a fifteen-joint stick figure. This illustration is simplified for ease of understanding. Virtual skeletons in accordance with the present disclosure may include virtually any number of joints, each of which can be associated with virtually any number of parameters including, but not limited to, three dimensional joint position, joint rotation, and body posture of a corresponding body part (e.g., arm extended, hand open, hand closed, etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.). It will also be appreciated that multiple operators and corresponding virtual skeletons may be tracked and generated at the same time.

With reference again to FIG. 1, it will also be appreciated that in some examples one or more of the skeletal tracking program 60, line monitoring program 26 and their various components may reside on one or more other computing devices. In these examples, depth image data 46 and/or visual image data 54 may be provided to such program(s) and component(s) via network 42.

Figure 3:
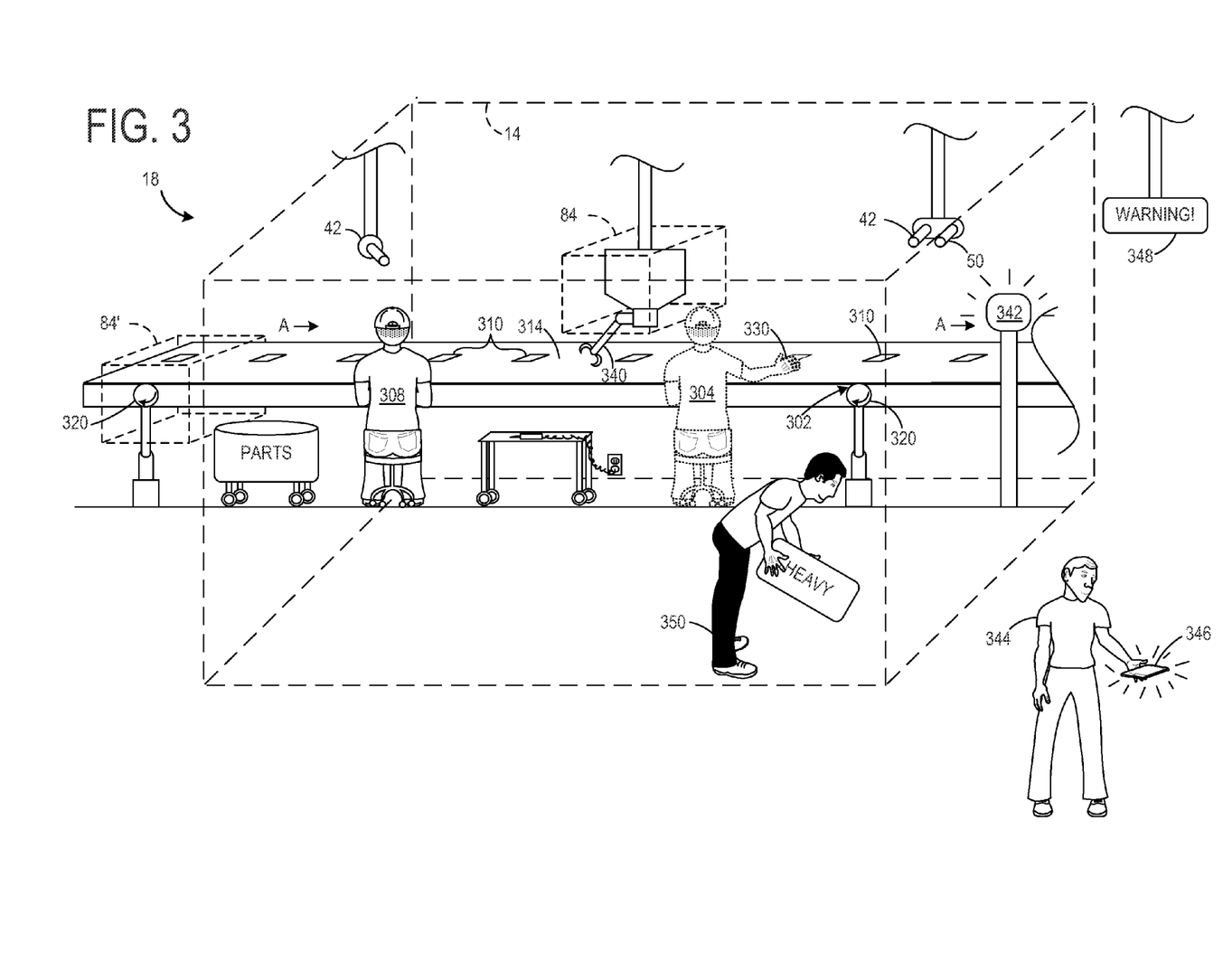
FIG. 3 is a schematic perspective view of a manufacturing line and workstation region.

With reference now to FIG. 3, example use cases of the monitoring system 10 will now be described with respect to an exemplary manufacturing line 18 and workstation region 14. Within the workstation region 14, operators 304 and 308 may be seated at a moving conveyor belt 314 and may handle and perform various operations on workpieces 310 traveling along the moving conveyor belt. The workpieces 310 may comprise any type of products, items, components, or the like. In the present example the workpieces 310 may comprise circuit boards for an electronic device.

It will be appreciated that the conveyor belt 314 and workstation region 14 depicted in FIG. 2 are merely examples provided for purposes of description, and that principles of the present disclosure are applicable to any type of manufacturing or production environment such as, for example, product assembly, testing, processing, packaging and handling environments. Further, the principles of the present disclosure may be utilized with any type of conveyor or material handling/manipulation system such as, for example, belt conveyors, roller conveyors, skatewheel conveyors, bucket conveyors, screw conveyors, industrial/assembly robotic arms, grippers, feed chutes, etc.

Figure 4:
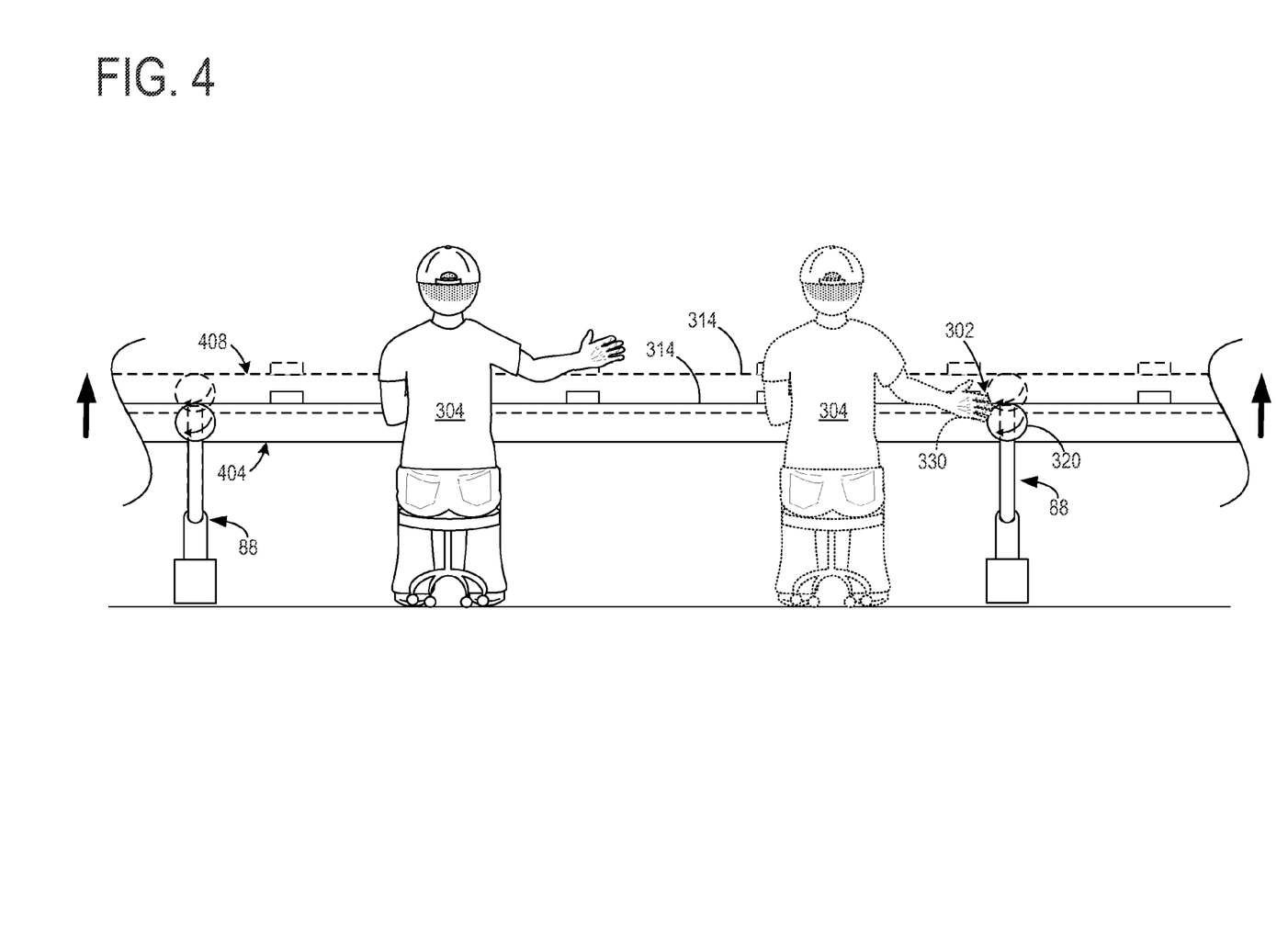
FIG. 4 is a schematic perspective view of a portion of the manufacturing line and workstation region of FIG. 3.

The conveyor belt 314 may be moving in the direction of action arrow A, and may be supported by rollers 320 along its path of travel. With reference also to FIG. 4, the nip 302 created at the contact point of the roller 320 and the underside of the conveyor belt 314 may constitute a hazard 16 in the workstation region 14. For example, if operator 304 moves his hand 330 into the nip 432, his hand and arm may be pulled in between the nip and roller 320 and injured. It will be appreciated that a variety of other types of hazards 16 that pose the potential for injury may exist in the workstation region 14. As one example, the robotic arm 340 may be a hazard as the moving parts of the arm can create pinch points that could entrap a finger, hand or other appendage of an operator.

As noted above, depth cameras 44 may be trained on the workstation region 14. In one example, a depth map generated by one or more of the depth cameras 44 may identify the location of the nip 402 in the 3D space of the workstation region 14. Utilizing the depth image data 46 and corresponding series of movements of the operator 304, the line monitoring program 26 may determine that the operator 304 is within a predetermined distance of the nip 402. It will be appreciated that any suitable predetermined distance may be utilized, and that customized predetermined distances may be employed for different types of hazards. In some examples, the predetermined distance may be between approximately 1 cm. and approximately 20 cm, between approximately 5 cm. and approximately 15 cm, or may be approximately 10 cm.

With reference again to FIG. 1, the line monitoring program 26 may receive operational status data 66 from the manufacturing line 18 that indicates an operational status of the line. Where the operational status data 66 indicates that the manufacturing line 18 is operating, and the line monitoring program 26 determines that the operator 304 is within the predetermined distance of the nip 402, in response the line monitoring program 26 may issue a command 58 to the manufacturing line 18 to cease operating. Advantageously, in this manner the rollers 320 may stop rotating before the operator's hand 330 enters the nip 402, thereby avoiding potential injury to the operator's hand. In other examples, the line monitoring program 26 may engage a robotic system, such as a robotic arm, that physically engages the operator 304 to remove the operator from the potentially dangerous situation.

In another example and in response to determining that the operator 304 is within a predetermined distance of a hazard, the line monitoring program 26 may issue an alert 70 to the notification system 62 associated with the manufacturing line 18. For example and with reference again to FIG. 3, movements of the operator's hand 330 may indicate that the hand is moving toward the robotic arm 340. In this example, a predetermined distance may be 0.5 meters. When the operator's hand 330 reaches 0.5 meters from the robotic arm 340, the line monitoring program 26 may issue an alert 70 in the form of activating a flashing beacon 342 located in the workstation region 14. The flashing beacon 342 may draw the operator's attention and lead the operator to avoid touching the robotic arm 340.

Figure 5:
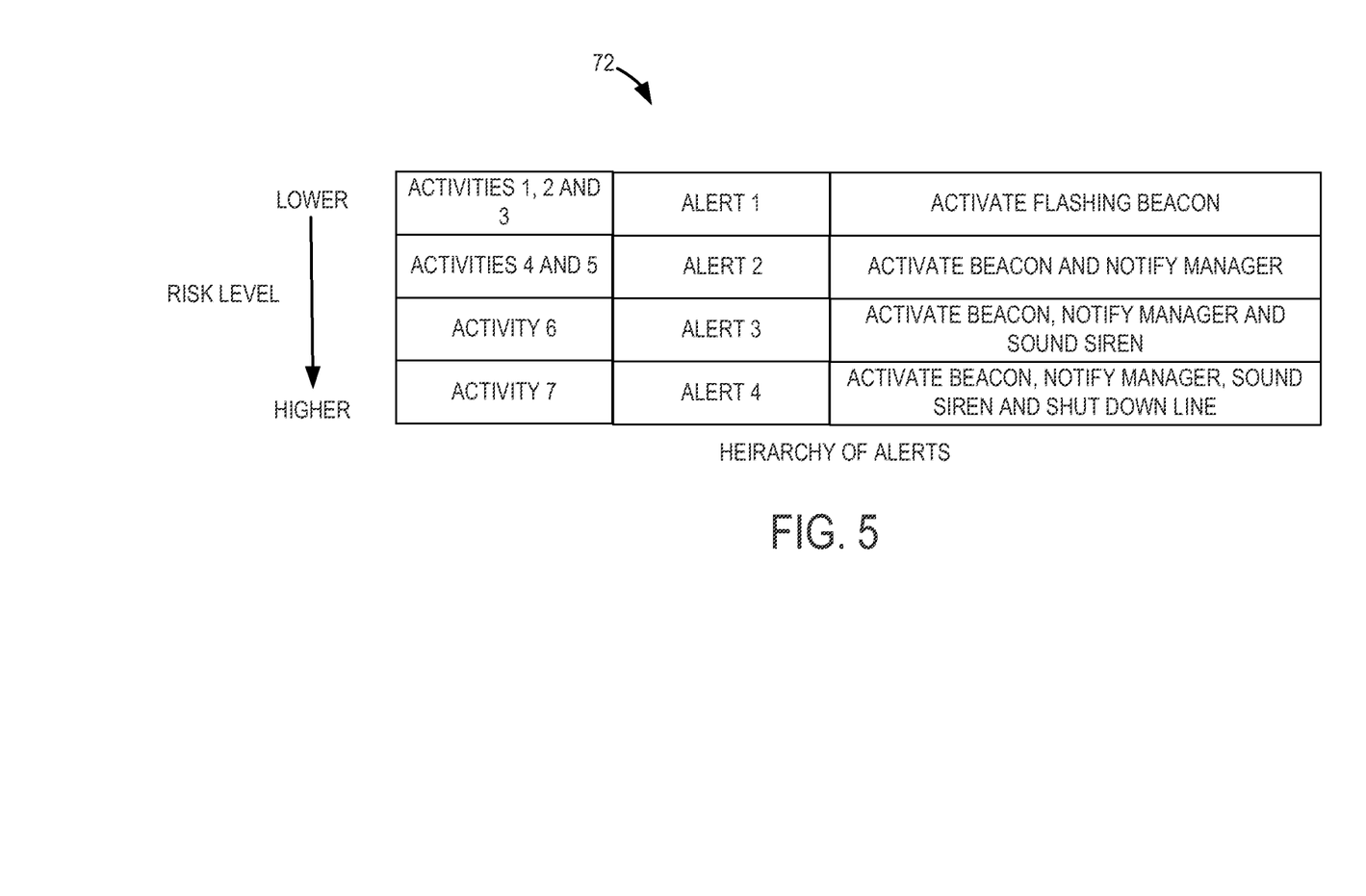
FIG. 5 is a schematic illustration of a hierarchy of alerts.

With reference now also to FIG. 5, in some examples a hierarchy of alerts 72 may be utilized. Each of the alerts may be associated with one or more operator activities that may be classified according to a risk level to an operator. As shown in FIG. 5, two or more operator activities may be classified as presenting a similar risk level, and accordingly may be paired with the same alert. Further, as the risk level of the operator activity increases, the magnitude of the corresponding alert similarly increases.

For example, the example in which the operator's hand 330 reaches 0.5 meters from the robotic arm 340 may be classified as an Alert 1 and may be paired with activating the flashing beacon 342. However, an example in which the operator's hand 330 is determined to have entered the nip 230 may be classified as an Alert 4 in which the flashing beacon 342 is activated, the operator's manager 344 is notified, a siren in the workstation region 14 is sounded and the manufacturing line 18 is shut down. As shown in FIG. 3, in one example the operator's manager may be notified via an alert sent to a tablet 346, smart phone or other mobile device. Other examples of alerts may include, but are not limited to, textual alerts displayed via a reader board 348 or other sign, and computer-generated spoken warnings that are broadcast to the manufacturing line 18, to the operator's manager 344 via a mobile or other computing device, and/or to other locations.

It will also be appreciated that a wide variety of operator activities may be identified and classified as discussed above. Such activities may include, but are not limited to, lifting an object using improper form, handling a workpiece 310 in a manner indicating workpiece damage or theft, causing potential damage to a workpiece or manufacturing line equipment, etc. It will also be appreciated that the alerts and the groupings of the alerts described in FIG. 5 are merely examples provided for illustrative purposes only, and that various other types and groupings of alerts may be provided and are within the scope of the present disclosure.

In one example, an operator may use improper form to lift an object. With reference again to FIG. 3, an operator 350 may be bending from the waist to lift a heavy object from the floor, which could cause back strain or other injury. Using the depth image data 46 and corresponding series of movements of the operator 350, the line monitoring program 26 may determine that the posture of the operator 350 matches a safety template 74 to within a matching threshold, wherein the posture creates an injury risk for a predetermined activity. For example, the safety template 74 may comprise a skeletal model generally representing a person bending from the waist with arms reaching downward. In some examples the depth image data 46 and/or visual image data 54 may also identify the object the operator 350 is reaching for as a heavy object more likely to cause injury.

The matching threshold may comprise, for example, a minimum degree of correlation between the operator's posture and the skeletal model of the safety template 74, such as 75% correlation, 80% correlation, 90% correlation, or any other suitable degree of correlation. Accordingly, and in response to determining that the posture of the operator 350 matches the safety template 74 to within the predetermined threshold, an alert may be issued to the notification system 62 associated with the manufacturing line 18.

In other examples, the line monitoring program 26 may detect a user activity, posture, and/or other characteristics that indicate the user 350 may have suffered an injury. For example and using the skeletal tracking program 60, the line monitoring program 26 may determine that a skeletal model of the user 350 appears in a position that is not normally attainable by the human body, such as a limb forming an unnatural angle that indicates a broken arm or leg. Upon such detection, the line monitoring program 26 may be configured to call a medical response team, security officer, or other proper contact.

In other examples, thermal imaging data may be used to estimate an operator's body temperature, which may be indicative of the operator's health. This data along with, perhaps, a skeletal model of the operator, may be used to determine that a user has become sick or otherwise incapacitated. In response, the line monitoring program 26 may be configured to issue a command to the manufacturing line 18 to cease operating and/or call a medical response team, security, or other proper contact.

In another example, visual image data 54 from the RGB camera 50 may be used along with the depth image data 46 to identify an operator activity that is associated with an alert. For example and with reference again to FIG. 3, the workpieces 310 may comprise electronic components that are sensitive to electrostatic discharge (ESD). Operators 304 and 308 may be required to wear ESD protection items, such as a conductive foot strap that is connected to ground. In one example, the conductive foot strap may have a distinctive color such as blue. Advantageously, the line monitoring program 26 may use visual image data 54 from the RGB camera 50 to determine whether the operators are wearing their required conductive foot straps. If they are not, then an alert may be issued.

In another example, one or more user-defined alert regions 84 may be established in the workstation region 14 or in other areas of the manufacturing line 18. In one example, a plant manager may establish a first user-defined alert region 84 surrounding a portion of the robotic arm 340 and a second user-defined alert region 84' surrounding a portion of the conveyor belt 314 that includes one of the rollers 320. Using the depth image data 46 and corresponding series of movements of the operators, the line monitoring program 26 may determine that the hand 330 of operator 304 enters the first user-defined alert region 84. In response, the line monitoring program 26 may issue a command to the manufacturing line 18 to cease operating.

In another example and with reference again to FIG. 4, the line monitoring program 26 may use depth image data 46 of an operator 304 and the manufacturing line 18 to programmatically determine that adjusting a position of the manufacturing line relative to the operator is warranted. In this example, the line monitoring program 26 may track movements of the operator 304 over time with the conveyor belt 314 at a first position 504. Based on analysis of these movements, the line monitoring program 26 may programmatically determine that the height of the belt 314 at the first position 404 is less than an ergonomically-preferred height with respect to the ergonomic positioning of the operator's body.

Accordingly and using the depth image data of the operator 304 and the conveyor belt 314, the line monitoring program 26 may programmatically activate a self-configuration system 88 on the manufacturing line 18 to raise the conveyor belt to a second position 408 in which the belt is higher relative to the operator. In this example the self-configuration system 88 may comprise powered, telescoping supports that may be raised and lowered to change the height of the conveyor belt 314. It will be appreciated that in other examples, a self-configuration system 88 may take a variety of other forms, and may utilize a variety of other components to adjust a position of one or more components or aspects of the manufacturing line 18 relative to an operator. Such components and aspects may include, for example, parts bins, stools, chairs, swing arms, desks, etc.

In some examples, biometric information of an operator may be used to identify the operator and to adjust the manufacturing line 18 based on operator preferences. In other examples, maximum and/or minimum settings of manufacturing line positions may be determined by operator skeletal size and/or other known ergonomic data.

Advantageously, in this manner the line monitoring program 26 may use depth image data 46 of the operator 304 and the manufacturing line 18 to programmatically adjust, on a real-time basis, a position of the manufacturing line 18 relative to one or more operators. Such adjustments may be used, for example, to accommodate different operators working different shifts on the manufacturing line 18, standing versus sitting operators, etc.

Figure 6A:
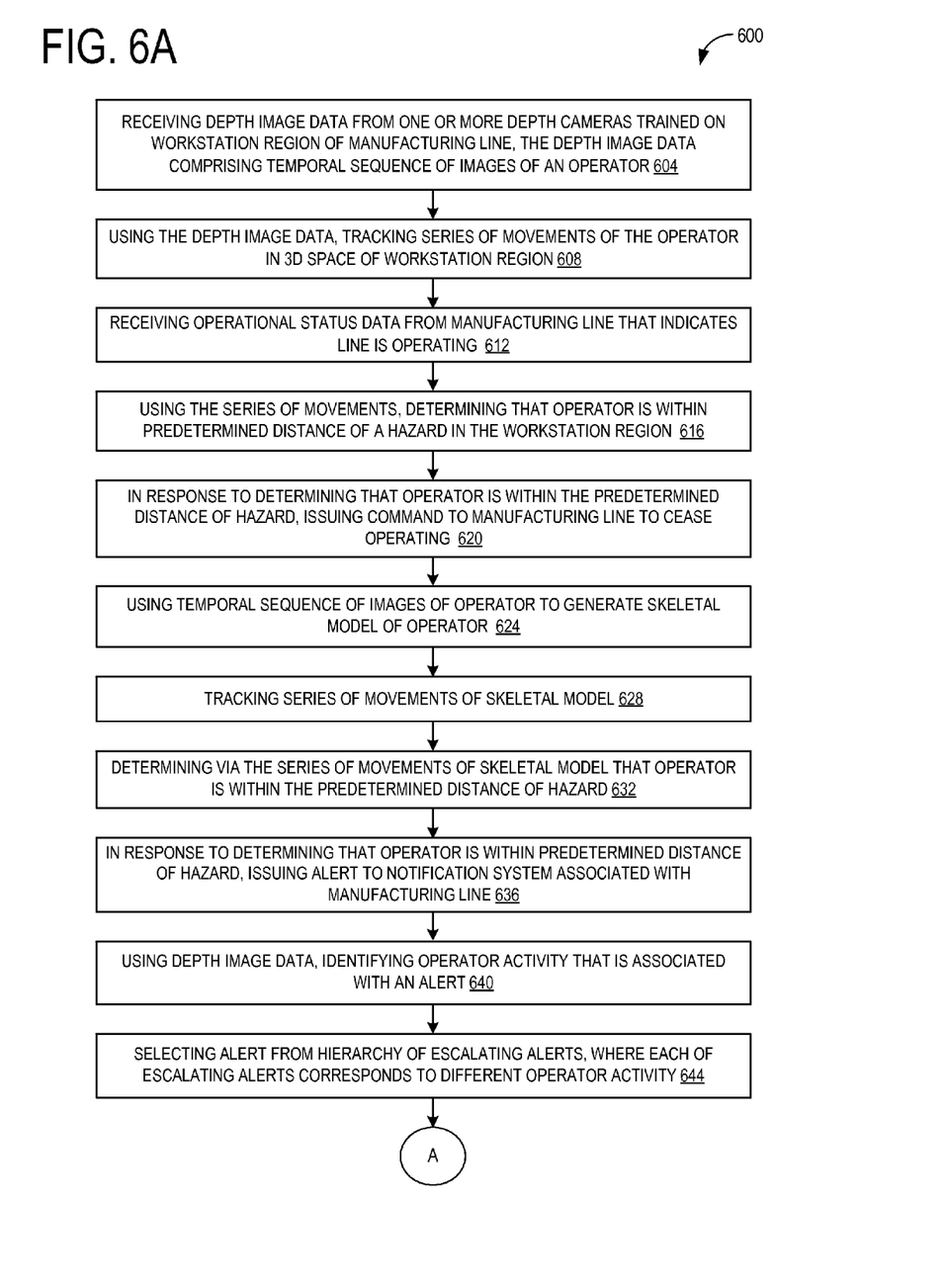
FIGS. 6A and 6B are flow diagrams illustrating a method for monitoring a workstation region of a manufacturing line according to one embodiment of the present disclosure.
Figure 6B:
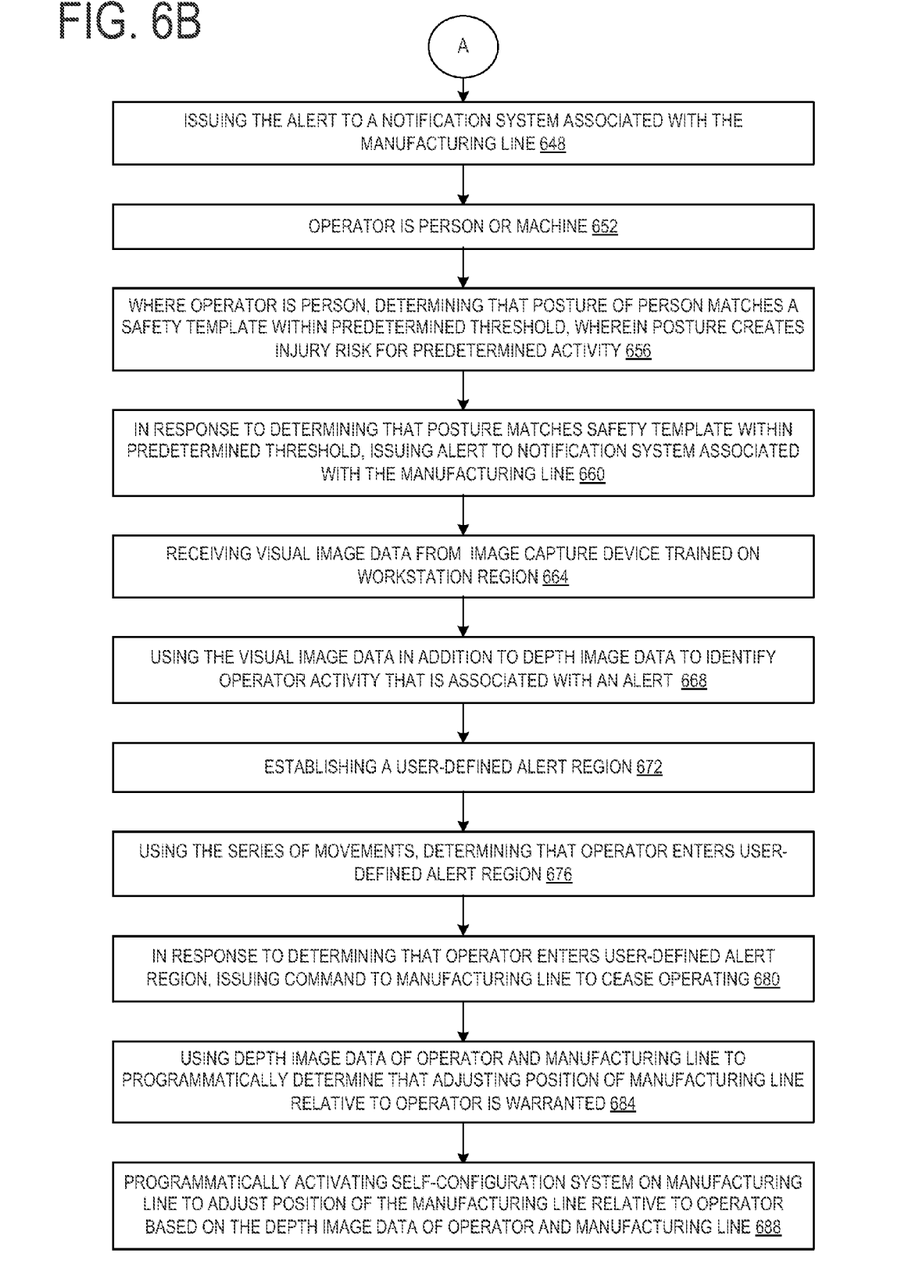

Turning now to FIGS. 6A and 6B, an embodiment of a method 600 for monitoring a workstation region of a manufacturing line will now be described. The method 600 may be performed using the hardware and software components of the monitoring system 10 described above, or using any other suitable components.

At 604 the method 600 may include receiving depth image data from one or more depth cameras trained on the workstation region, with the depth image data comprising a temporal sequence of images of an operator. At 608 the method 600 may include, using the depth image data, tracking a series of movements of the operator in 3D space of the workstation region. At 612 the method 600 may include receiving operational status data from the manufacturing line that indicates the manufacturing line is operating.

At 616 the method 600 may include, using the series of movements, determining that the operator is within a predetermined distance of a hazard in the workstation region. At 620 the method 600 may include, in response to determining that the operator is within the predetermined distance of the hazard, issuing a command to the manufacturing line to cease operating. At 624 the method 600 may include using the temporal sequence of images of the operator to generate a skeletal model of the operator. At 628 the method 600 may include tracking a series of movements of the skeletal model.

At 632 the method 600 may include determining via the series of movements of the skeletal model that the operator is within the predetermined distance of the hazard. At 636 the method 600 may include, in response to determining that the operator is within the predetermined distance of the hazard, issuing an alert to a notification system associated with the manufacturing line. At 640 the method 600 may include, using the depth image data, identifying an operator activity that is associated with an alert. At 644 the method 600 may include selecting the alert from a hierarchy of escalating alerts, where each of the escalating alerts corresponds to a different operator activity.

With reference now to FIG. 6B, at 648 the method 600 may include issuing the alert to a notification system associated with the manufacturing line. At 652 the operator may be a person or a machine. At 656 and where the operator is a person, the method 600 may include determining that a posture of the person matches a safety template to within a matching threshold, wherein the posture creates an injury risk for a predetermined activity. At 660 the method 600 may include, in response to determining that the posture of the person matches the safety template to within the predetermined threshold, issuing the alert to the notification system associated with the manufacturing line. At 664 the method 600 may include receiving visual image data from an image capture device trained on the workstation region. At 668 the method 600 may include using the visual image data in addition to the depth image data to identify the operator activity that is associated with an alert.

At 672 the method 600 may include establishing a user-defined alert region. At 676 the method 600 may include, using the series of movements, determining that the operator enters the user-defined alert region. At 680 the method 600 may include, in response to determining that the operator enters the user-defined alert region, issuing the command to the manufacturing line to cease operating. At 684 the method 600 may include using the depth image data of the operator and the manufacturing line to programmatically determine that adjusting a position of the manufacturing line relative to the operator is warranted. At 688 the method 600 may include programmatically activating a self-configuration system on the manufacturing line to adjust a position of the manufacturing line relative to the operator based on the depth image data of the operator and the manufacturing line.

It will be appreciated that method 600 is provided by way of example and is not meant to be limiting. Therefore, it is to be understood that method 600 may include additional and/or alternative steps than those illustrated in FIGS. 6A and 6B. Further, it is to be understood that method 600 may be performed in any suitable order. Further still, it is to be understood that one or more steps may be omitted from method 600 without departing from the scope of this disclosure.

Figure 7:
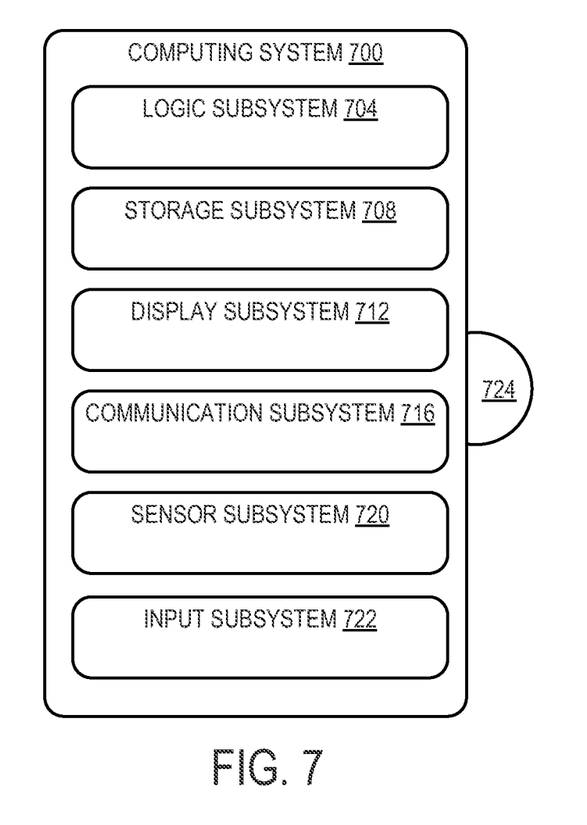
FIG. 7 is a simplified schematic illustration of an embodiment of a computing device.

FIG. 7 schematically shows a nonlimiting embodiment of a computing system 700 that may perform one or more of the above described methods and processes. Computing device 22 may take the form of computing system 700. Computing system 700 is shown in simplified form. It is to be understood that virtually any computer architecture may be used without departing from the scope of this disclosure.

In different embodiments, computing system 700 may take the form of a mainframe computer, server computer, desktop computer, laptop computer, tablet computer, home entertainment computer, network computing device, mobile computing device, mobile communication device, gaming device, etc.

As shown in FIG. 7, computing system 700 may include a logic subsystem 704 and a storage subsystem 708. In some examples computing system 700 may also include a display subsystem 712, a communication subsystem 716, a sensor subsystem 720 and/or an input subsystem 722. Computing system 700 may also optionally include other subsystems and components not shown in FIG. 7. Computing system 700 may also include computer readable media, with the computer readable media including computer readable storage media and computer readable communication media. Computing system 700 may also optionally include other user input devices such as keyboards, mice, game controllers, and/or touch screens, for example. Further, in some embodiments the methods and processes described herein may be implemented as a computer application, computer API, computer library, and/or other computer program product in a computing system that includes one or more computers.

Logic subsystem 704 may include one or more physical devices configured to execute one or more instructions. For example, the logic subsystem 704 may be configured to execute one or more instructions that are part of one or more applications, programs, routines, libraries, objects, components, data structures, or other logical constructs. Such instructions may be implemented to perform a task, implement a data type, transform the state of one or more devices, or otherwise arrive at a desired result.

The logic subsystem 704 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 708 may include one or more physical, persistent devices configured to hold data and/or instructions executable by the logic subsystem 704 to implement the herein described methods and processes. When such methods and processes are implemented, the state of storage subsystem 708 may be transformed (e.g., to hold different data).

Storage subsystem 708 may include removable media and/or built-in devices. Storage subsystem 708 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 708 may include devices with one or more of the following characteristics: volatile, nonvolatile, dynamic, static, read/write, read-only, random access, sequential access, location addressable, file addressable, and content addressable.

In some embodiments, aspects of logic subsystem 704 and storage subsystem 708 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 7 also shows an aspect of the storage subsystem 708 in the form of removable computer readable storage media 724, which may be used to store data and/or instructions executable to implement the methods and processes described herein. Removable computer-readable storage media 724 are physical devices that may take the form of CDs, DVDs, HD-DVDs, Blu-Ray Discs, EEPROMs, and/or floppy disks, among others, and hold the data and/or instructions in a persistent manner, for a finite duration.

In contrast, in some embodiments aspects of the instructions described herein may be propagated by computer-readable communications media, such as a communications bus, port, or optical fiber, etc., in a transitory fashion by a pure signal (e.g., an electromagnetic signal, an optical signal, etc.) that is not held by a physical device for at least a finite duration.

When included, display subsystem 712 may be used to present a visual representation of data held by storage subsystem 708. As the above described methods and processes change the data held by the storage subsystem 708, and thus transform the state of the storage subsystem, the state of the display subsystem 712 may likewise be transformed to visually represent changes in the underlying data. The display subsystem 712 may include one or more display devices utilizing virtually any type of technology. Such display devices may be combined with logic subsystem 704 and/or storage subsystem 708 in a shared enclosure, or such display devices may be peripheral display devices.

When included, communication subsystem 716 may be configured to communicatively couple computing system 700 with one or more networks and/or one or more other computing devices. Communication subsystem 716 may include wired and/or wireless communication devices compatible with one or more different communication protocols. As nonlimiting examples, the communication subsystem 716 may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

Sensor subsystem 720 may include one or more sensors configured to sense different physical phenomenon (e.g., visible light, infrared light, position, orientation, acceleration, sound, etc.) as described above. Sensor subsystem 720 may be configured to provide sensor data to logic subsystem 704, for example. As described above, such data may include depth image data, visual image data, and/or any other suitable sensor data that may be used to perform the methods and processes described above.

When included, input subsystem 722 may comprise or interface with one or more sensors or user-input devices such as an inertial measurement unit, game controller, gesture input detection device, wearable computing device, voice recognizer, keyboard, mouse, or touch screen. In some embodiments, the input subsystem 722 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the monitoring system 10 that is implemented to perform one or more particular functions. In some cases, such a program may be instantiated via logic subsystem 704 executing instructions held by storage subsystem 708. It is to be understood that different programs may be instantiated from the same application, code block, object, library, routine, API, function, etc. Likewise, the same program may be instantiated by different applications, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for monitoring a workstation region of a manufacturing line, comprising:
   receiving depth image data at a computing device comprising a processor and a line monitoring program executable by the processor, the depth image data received from one or more depth cameras trained on the workstation region, the depth image data comprising a temporal sequence of images of an operator, the line monitoring program:
   using the depth image data, tracking a series of movements of the operator in 3D space of the workstation region;
   using the series of movements, determining that the operator is within a predetermined distance of a hazard in the workstation region;
   in response to determining that the operator is within the predetermined distance of the hazard, selecting an alert from a hierarchy of escalating alerts, where each of the escalating alerts corresponds to a different operator activity; and
   issuing the alert to a notification system associated with the manufacturing line.

2. The method of claim 1, further comprising a skeletal tracking program executable by the processor, the skeletal tracking program:
   using the temporal sequence of images of the operator to generate a skeletal model of the operator; and
   tracking a series of movements of the skeletal model; and
   the line monitoring program determining via the series of movements of the skeletal model that the operator is within the predetermined distance of the hazard.

3. The method of claim 1, further comprising the line monitoring program, in response to determining that the operator is within the predetermined distance of the hazard, issuing an alert to a notification system associated with the manufacturing line.

4. The method of claim 1, wherein the operator is a person or a machine.

5. The method of claim 4, wherein the operator is a person, the method further comprising the line monitoring program:
   determining that a posture of the person matches a safety template to within a matching threshold, wherein the posture creates an injury risk for a predetermined activity; and
   in response to determining that the posture of the person matches the safety template to within the predetermined threshold, issuing the alert to the notification system associated with the manufacturing line.

6. The method of claim 5, further comprising the line monitoring program:
   receiving visual image data from an RGB camera trained on the workstation region; and
   using the visual image data in addition to the depth image data to identify the operator activity that is associated with an alert.

7. The method of claim 1, further comprising the line monitoring program:
   establishing a user-defined alert region;
   using the series of movements, determining that the operator enters the user-defined alert region; and
   in response to determining that the operator enters the user-defined alert region, issuing a command to the manufacturing line to cease operating.

8. The method of claim 1, further comprising the line monitoring program:
   using the depth image data of the operator and the manufacturing line to programmatically determine that adjusting a position of the manufacturing line relative to the operator is warranted; and
   programmatically activating a self-configuration system on the manufacturing line to adjust a position of the manufacturing line relative to the operator based on the depth image data of the operator and the manufacturing line.

9. A monitoring system for a workstation region of a manufacturing line, the monitoring system comprising:
   a computing device comprising a processor; and
   a line monitoring program comprising instructions stored in a mass storage of the computing device executable by the processor, the line monitoring program configured to:
   receive depth image data from one or more depth cameras trained on the workstation region, the depth image data comprising a temporal sequence of images of an operator;
   using the depth image data, track a series of movements of the operator in 3D space of the workstation region;
   wherein the operator is a person, determine that a posture of the person matches a safety template to within a predetermined threshold, wherein the posture creates an injury risk for a predetermined activity; and
   in response to determining that the posture of the person matches the safety template to within the predetermined threshold, issue an alert to a notification system associated with the manufacturing line.

10. The monitoring system of claim 9, further comprising a skeletal tracking program comprising instructions stored in the mass storage of the computing device executable by the processor, the skeletal tracking program configured to:
   use the temporal sequence of images of the operator to generate a skeletal model of the operator; and
   track a series of movements of the skeletal model; and the line monitoring program is further configured to determine via the series of movements of the skeletal model that the operator is within a redetermined distance of the hazard.

11. The monitoring system of claim 9, wherein the line monitoring program is further configured to, in response to determining that the operator is within a predetermined distance of the hazard, issue an alert to a notification system associated with the manufacturing line.

12. The monitoring system of claim 9, wherein the line monitoring program is further configured to:
   using the depth image data, identify an operator activity that is associated with an alert;
   select the alert from a hierarchy of escalating alerts, where each of the escalating alerts corresponds to a different operator activity; and
   issue the alert to a notification system associated with the manufacturing line.

13. The monitoring system of claim 12, wherein the operator is a person or a machine.

14. The monitoring system of claim 9, wherein the line monitoring program is further configured to:
   receive visual image data from an image capture device trained on the workstation region; and
   use the visual image data in addition to the depth image data to identify an operator activity that is associated with an alert.

15. The monitoring system of claim 9, wherein the line monitoring program is further configured to:
   establish a user-defined alert region;
   using the series of movements, determine that the operator enters the user-defined alert region; and
   in response to determining that the operator enters the user-defined alert region, issue a command to the manufacturing line to cease operating.

16. The monitoring system of claim 9, wherein the line monitoring program is further configured to:
   use the depth image data of the operator and the manufacturing line to programmatically determine that adjusting a position of the manufacturing line relative to the operator is warranted; and
   programmatically activate a self-configuration system on the manufacturing line to adjust a position of the manufacturing line relative to the operator based on the depth image data of the operator and the manufacturing line.

17. A method for monitoring a workstation region of a manufacturing line, comprising:
   receiving depth image data at a computing device comprising a processor and a line monitoring program executable by the processor, the depth image data received from one or more depth cameras trained on the workstation region, the depth image data comprising a temporal sequence of images of an operator, the line monitoring program:
   using the depth image data, tracking a series of movements of the operator in 3D space of the workstation region;
   using the depth image data of the operator and the manufacturing line to programmatically determine that adjusting a position of the manufacturing line relative to the operator is warranted; and
   programmatically activating a self-configuration system on the manufacturing line to adjust a position of the manufacturing line relative to the operator based on the depth image data of the operator and the manufacturing line.

18. The method of claim 17, further comprising the line monitoring program, in response to determining that the operator is within a predetermined distance of the hazard, issuing an alert to a notification system associated with the manufacturing line, wherein the alert is selected from a hierarchy of escalating alerts that each correspond to a different operator activity.

* * * * *